(12) United States Patent
Okada

(10) Patent No.: US 8,926,195 B2
(45) Date of Patent: Jan. 6, 2015

(54) OPTICAL MODULE HAVING OPTICAL ASSEMBLY PRECISELY ALIGNED WITH OPTICAL FIBER

(71) Applicant: Sumitomo Electric Device Innovations, Inc., Yokohama-shi (JP)

(72) Inventor: Takeshi Okada, Yokohama (JP)

(73) Assignee: Sumitomo Electric Device Innovations, Inc., Yokohama-shi (JP)

(*) Notice: Subject to any disclaimer, the term of this patent is extended or adjusted under 35 U.S.C. 154(b) by 0 days.

(21) Appl. No.: 13/797,015

(22) Filed: Mar. 12, 2013

(65) Prior Publication Data

US 2013/0251316 A1 Sep. 26, 2013

(30) Foreign Application Priority Data

Mar. 22, 2012 (JP) ................................ 2012-065544

(51) Int. Cl.
G02B 6/42 (2006.01)
B29D 11/00 (2006.01)

(52) U.S. Cl.
CPC ............ G02B 6/4256 (2013.01); G02B 6/4204 (2013.01); B29D 11/00 (2013.01)
USPC ............................................. 385/92; 385/52

(58) Field of Classification Search
CPC ........................... G02B 6/4204; G02B 6/4256

USPC .................................................. 385/52, 92, 94
See application file for complete search history.

(56) References Cited

U.S. PATENT DOCUMENTS

| | | | | |
|---|---|---|---|---|
| 4,296,998 A | * | 10/1981 | Dufft ............................... | 385/91 |
| H0000551 H | * | 12/1988 | Chaoui et al. .................... | 385/90 |
| 4,834,491 A | * | 5/1989 | Aoki et al. ....................... | 385/94 |
| 7,014,369 B2 | * | 3/2006 | Alcock et al. .................... | 385/57 |
| 7,086,787 B2 | | 8/2006 | Okada et al. | |
| 7,309,172 B2 | | 12/2007 | Okada | |
| 7,364,374 B2 | * | 4/2008 | Liu ................................. | 385/93 |
| 7,762,730 B2 | * | 7/2010 | Kihara et al. .................... | 385/92 |

FOREIGN PATENT DOCUMENTS

JP 2009-020542 1/2009

* cited by examiner

*Primary Examiner* — Charlie Peng
(74) *Attorney, Agent, or Firm* — Venable LLP; Michael A. Sartori; Tamatane J. Aga

(57) ABSTRACT

An optical module with an optical subassembly precisely aligned with an optical fiber is disclosed even when the optical axis of the optical subassembly and that of the optical fiber are perpendicular to each other. The optical module has an auxiliary with a knob and a flange each having a concentric circular periphery. The knob is held by chuck of the welding apparatus, while, the optical subassembly is fixed to the flange. Even when the optical subassembly is slid on the flange to align optically with the optical fiber, the positions of the laser beams for welding are kept on the periphery of the flange.

9 Claims, 6 Drawing Sheets

OPTICAL MODULE HAVING OPTICAL ASSEMBLY PRECISELY ALIGNED WITH OPTICAL FIBER

BACKGROUND OF THE INVENTION

1. Field of the Invention

The present invention relates to an optical module that provides a plurality of optical assemblies, some of which are precisely assembled even in perpendicular to an axis of an optical fiber.

2. Related Background Arts

A bi-directional optical module, which provides an optical subassembly to transmit an optical signal to and another optical subassembly to receive an optical signal from a single fiber, has been well known. FIG. 6 is a plan view of such a bi-directional optical module 101, where the optical module 101 provides two transmitter subassemblies, 103 and 104, a receiver subassembly 102, and some other optical components, 106 to 108, set in a housing 109.

One of optical transmitter subassemblies 104 aligns the optical axis thereof with that C of the optical fiber 105a; while, the other of the transmitter subassemblies 103 has the optical axis D2 perpendicular to that C of the optical fiber 105a. Those optical subassemblies, 103 and 104, are fixed to the housing 109 after the optical alignment with respect to the optical fiber 105a is carried out. The optical alignment of one of the transmitter subassemblies 104 in a plane perpendicular to the optical axis C is simply carried out because this transmitter subassembly 104 has the optical axis common to that of the optical fiber 105a. However, the optical alignment of the other of the transmitter subassemblies 103 has the optical axis D2 perpendicular to the optical axis C is complicated because, not only the optical axis D2 is perpendicular to that C of the optical fiber 105a, but the housing 109 has a shape asymmetric with respect to the axis D2.

When an optical component has a cylindrical or pillar shape, such as optical subassemblies, 102 to 104; an apparatus for performing the optical alignment and then fixation as maintaining the aligned status of the components can easily pick such an optical component as keeping the positional accuracy thereof, namely, aligned status of the component by, for example, a chuck. However, the housing 109 generally has a complex shape because, in a case of a bi-directional optical module, the housing 109 installs optical components of WDM filters, 107 and 108, and a lens 106 therein. For such deformed housing, specifically, an asymmetric shape with respect to the optical axis D2 of the optical subassembly 103, it is quite hard to realize the precise optical alignment of the optical subassembly 103 because the apparatus, or the chuck, cannot hold the housing 109 stably during the alignment and the fixation.

SUMMARY OF THE INVENTION

An aspect of one of the embodiments of the present invention relates to an optical module that includes a housing, a coupling unit, an optical subassembly, and an auxiliary. The coupling unit, which is fixed to the housing, supports an optical fiber that provides a primary optical axis. The optical subassembly has an optical axis substantially perpendicular to the primary optical axis of the optical fiber. The auxiliary includes a knob and a flange, both of which has a circular periphery concentric to each other, where the flange is fixed to the optical subassembly, while, the auxiliary installs an optical component to align the optical axis of the optical subassembly with the primary optical axis. A feature of the optical module according to the embodiment is that, even when the housing has an asymmetric outer shape with respect to the optical axis of the optical subassembly and the optical axis makes a substantially right angle to the primary optical axis of the optical fiber, the optical subassembly is precisely aligned with the optical fiber through the auxiliary attached to the housing.

Another aspect of one of the embodiments of the present invention relates to manufacture an optical module that includes a coupling unit, an optical subassembly, an auxiliary and a housing. The coupling unit holds an optical fiber that provides a primary optical axis. The optical subassembly has an optical axis substantially perpendicular to the primary optical axis. The housing has an asymmetric outer shape with respect to the optical axis of the optical subassembly. A feature of the methods is that the housing and the subassembly are first set on a welding apparatus that has a first chuck to hold the auxiliary and a second chuck to set the optical subassembly movably thereon; the optical subassembly is secondly aligned optically with the optical fiber by moving the first chuck vertically and the second chuck horizontally until a preset optical coupling efficient is obtained between the optical subassembly and the optical fiber; and the optical subassembly is thirdly welded to the auxiliary.

The first chuck holds a knob provided in the auxiliary and the optical subassembly is fixed to the flange of the auxiliary, wherein the knob and the flange each has a circular periphery concentric to each other. In addition to the first and second chucks, the welding apparatus provides a plurality of heads each emitting a laser beam for the welding, and these laser beams focus on the periphery of the flange of auxiliary. Accordingly, even the second chuck is moved horizontally and the first chuck is moved vertically, the focused points of the laser beams are invariably on the periphery of the flange of the auxiliary.

BRIEF DESCRIPTION OF THE DRAWINGS

The foregoing and other purposes, aspects and advantages will be better understood from the following detailed description of a preferred embodiment of the invention with references to the drawings, in which.

DESCRIPTION OF EMBODIMENTS

Figure 1:
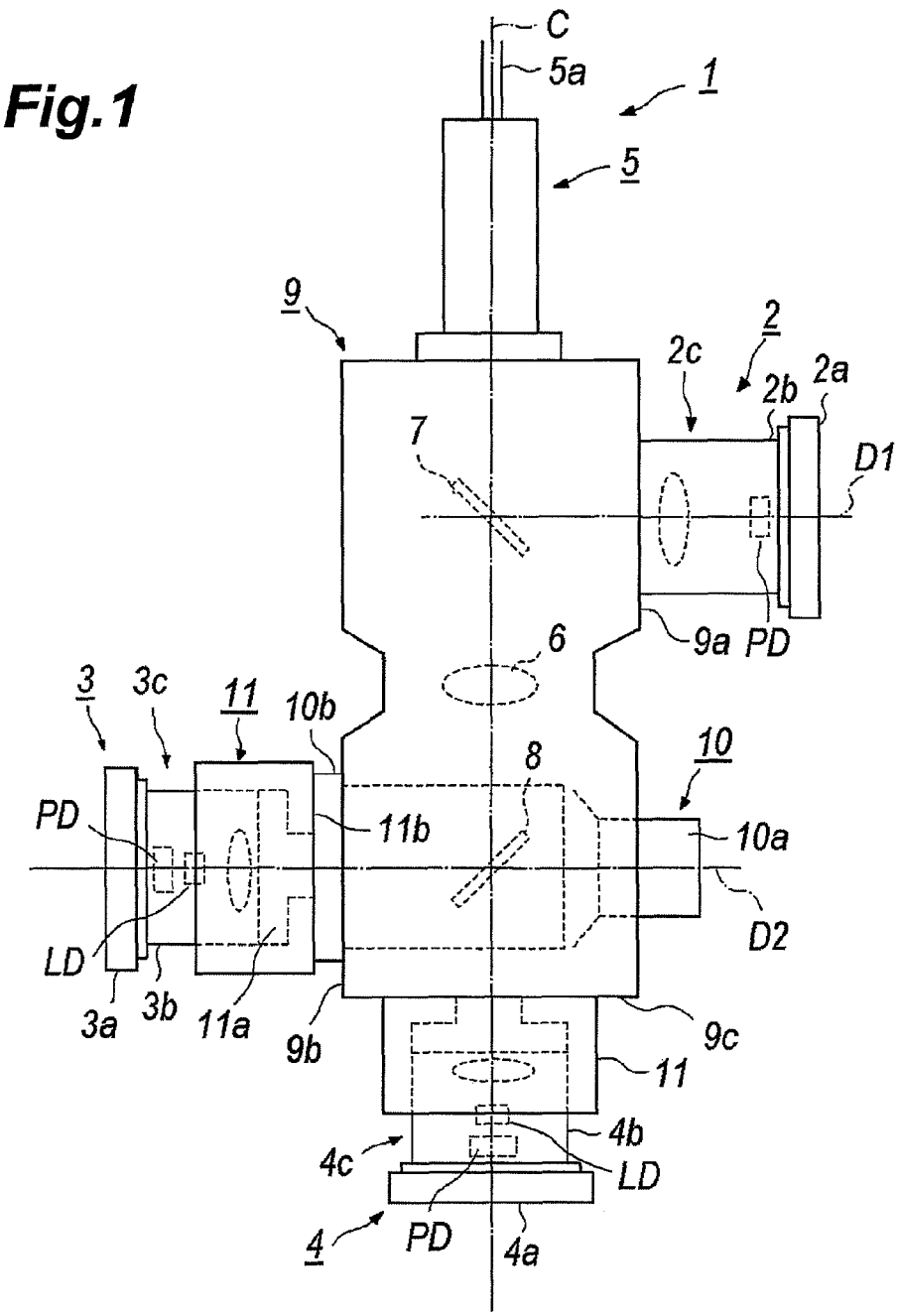
FIG. 1 is a plan view of an optical module according to an embodiment of the present invention.

An optical module according to embodiments of the invention will be described as referring to FIGS. 1 to 3. The optical module 1 shown in figures is what is called a type of a bi-directional optical module to transmit an optical signal to and to receive another optical signal from a single fiber. The optical module 1 provides an optical receiver subassembly 2, a first optical transmitter subassembly 3, a second optical transmitter subassembly 4, a coupling unit 5, a lens 6, first and second WDM filters, 7 and 8, a housing 9, an auxiliary 10, and a joint sleeve 11 (hereafter denoted as J-sleeve).

The optical receiver subassembly 2, the first and second optical transmitter subassemblies, 3 and 4, each has a co-axial package, 2c to 4c, that includes a stem, 2a to 4a, and a cap, 2b to 4b. Each of stems, 2a to 4a, has a plurality of leads, which are not illustrated in the figures, while, each of caps, 2b to 4b, provides a window in a ceiling thereof and encloses a photodiode (PD) or a laser diode (LD) therein. The window may be made of a parallel plate glass, or a lens. The housing 9, which is a metal housing, installs another lens 6 and the WDM filters, 7 and 8, therein. The optical receiver subassembly 2 and the optical transmitter subassemblies, 3 and 4, are assembled with the housing 9 by, for instance, the YAG laser welding after aligning optically with the coupling unit 5, which is also fixed to the housing 9.

The optical receiver subassembly 2 is fixed in a side of the housing 9; specifically, the optical receiver subassembly 2 is assembled with one side 9a of the housing 9 such that an optical axis D1 of the optical receiver subassembly 2 intersects the primary optical axis C of the optical fiber 5a which is permanently supported within the coupling unit 5 by substantially a right angle, where this type of the optical fiber is often called as a pig-tail fiber. The receiver subassembly 2 may receive by the PD installed therein an optical signal, which has the first wavelength, output from the optical fiber 5a and reflected by the first WDM filter 7. The optical receiver subassembly 2 provides an electrical signal converted by the PD through the leads.

The first optical transmitter subassembly 3 is fixed in another side of the housing 9; specifically, the first optical transmitter subassembly 3 is fixed in the side 9b of the housing 9 through the auxiliary 10 and the J-sleeve 11 such that an optical axis D2 of the first transmitter subassembly 3 intersects the optical axis C of the optical fiber 5a. The first transmitter subassembly 3 may output an optical signal generated by an LD installed therein to couple optically with the optical fiber 5a. Specifically, the LD in the first transmitter subassembly 3 may generate the optical signal, which has a second wavelength different from the first wavelength, and this optical signal enters the optical fiber 5a after being concentrated by the lens implemented within the first optical transmitter subassembly 3, reflected by the second WDM filter 8, focused by another lens 6 in the housing 9, and passing through the first WDM filter 7. The first transmitter subassembly 3 provides a plurality of leads in the stem 3a thereof, not explicitly shown in the figures, to receive an electrical signal to drive the LD.

The second transmitter subassembly 4 is assembled with the housing 9 through the J-sleeve 11 attached to a side 9c opposite to the side to which the coupling unit 5 is fixed such that the optical axis of the second transmitter subassembly 4 aligns with the optical axis C of the optical fiber 5a. The second transmitter subassembly 4 outputs an optical signal having the third wavelength different from the first and second wavelengths. The optical signal output from the second transmitter subassembly 4 enters the optical fiber 5a through the lens in the ceiling of the cap 4b, passing through the second WDM filter 8, focused by the lens 6, and passing through the first WDM filter 7. The LD in the second transmitter subassembly 4 also receives another electrical signal through the leads.

The coupling unit 5 includes a stub made of, for instance, zirconia and press-fit within a metal cylinder which is welded to one surface of the housing 9. The stub provides a coupling fiber in a center thereof to couple the optical fiber 5a with the PD in the receiver subassembly 2, and the LDs in the transmitter subassemblies, 3 and 4. Thus, the optical signal provided to the PD may be output from the end of the coupling fiber, or the other optical signals output from the transmitter subassemblies, 3 and 4; enter the end of the coupling fiber in the stub. This end of the coupling fiber may be inclined with respect to the optical axis C by about 5 to 7° to prevent light reflected thereat returning the LDs to cause optical noises.

The first and second WDM filters, 7 and 8, selectively transmit or reflect light depending on the wavelengths thereof. The bi-directional module 1 of the present embodiments arranges the lens 6 between two WDM filters, 7 and 8. However, optical arrangement of the bi-directional module is not restricted to those of the embodiments. The lens 6 may be put between the first WDM filter 7 and the coupling unit 5. Moreover, the bi-directional module 1 may further provide an optical isolator between two WDM filters, 7 and 8.

The housing 9 of the embodiment provides the auxiliary 10 set in an inner space formed in the housing 9 so as to cross the optical axis C. The auxiliary 10, which may be made of metal such as stainless steel and have a pillar shape, is inserted in the space in a direction perpendicular to the optical axis C, which may be aligned with the optical axis D2 of the first transmitter subassembly 3, and fixed in the edge of the space by, for instance, the YAG-laser welding.

Both ends of the auxiliary 10 expose from the sides of the housing 9. One of ends exposed oppositely to the first transmitter subassembly 3 operates as a knob 10a to be held by the chuck of the welding apparatus when the first transmitter subassembly 3 is assembled with the housing 9. Thus, the knob 10a may be a pillar shape with a circular cross section, or an arched cross section to define the center of the pillar.

The other ends of the auxiliary 10 exposing from the side 9b of the housing 9 has a flange 10b with a flat surface, where the optical alignment of the first transmitter subassembly 3 is performed and welded to the housing 9. Thus, the knob 10a and the flange 10b each has a circular periphery concentric to each other. The flange 10b has a donut cross section with a center aligned with the center of the knob 10a. The center of the knob 10a, and that of the flange 10b, intersects with the optical axis C of the optical fiber 5a in a substantially right angle.

Figure 2:
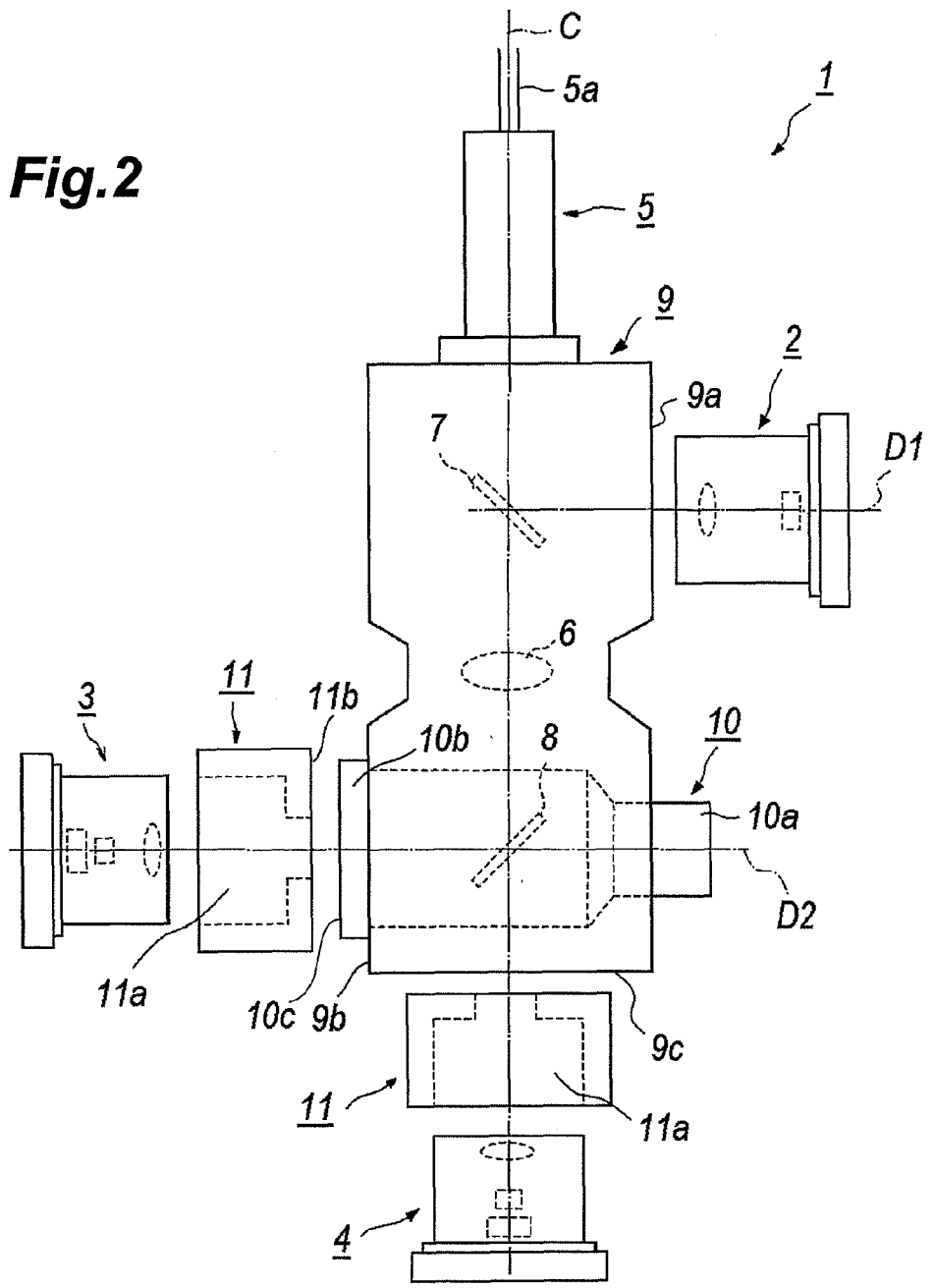
FIG. 2 is an exploded view of the optical module shown in FIG. 1.

FIG. 2 is an exploded view of the bi-directional module before the receiver subassembly 2 and the transmitter subassemblies, 3 and 4, are fixed to the housing 9. The receiver subassembly 2 is assembled in the side 9a of the housing 9 by the YAG-laser welding after the XY-alignment perpendicular to the optical axis D1 by sliding the receiver subassembly 2 on the side 9a.

The first transmitter subassembly 3 is assembled with the housing 9 via the J-sleeve 11. Specifically, the J-sleeve 11 provides a bore 11a into which the first transmitter subassembly 3 is set and a top 11b fixed to the flange 10b of the auxiliary 10. The optical alignment of the first transmitter subassembly 3 along the optical axis D2 thereof, which is the Z-alignment, is performed by adjusting the insertion depth of the first transmitter subassembly 3 into the bore 11a; while, the optical alignment in the XY-plane perpendicular to the optical axis D2 is carried out by sliding the J-sleeve 11 on the flange 10b. After the Z-alignment but before the XY-alignment, the first transmitter subassembly 3 is fixed to the J-sleeve 11 by piercing welding using the YAG-laser. The J-sleeve 11 is welded to the flange 10b after the XY-alignment described above at peripheries of the flange 10b as shown in FIG. 1.

The top 11b of the J-sleeve 11 is larger in an area thereof than that 10c of the flange 10b of the auxiliary 10; then, the top 11*b* fully covers the flange 10*b* even the top 11*b* slides on the surface 10*c* of the flange 10*b* at the XY-alignment. During the XY-alignment, the J-sleeve 11 is movably held by a magnetic component to make the top 11*b* of the J-sleeve 11 in physically contact with the surface 10*c* of the flange 10*b*.

The second transmitter subassembly 4 is, similar to the first transmitter subassembly 3, assembled with one surface 9*c* of the housing 9 via the J-sleeve 11. Specifically, the second transmitter subassembly 4 is first aligned in the direction parallel to the optical axis C by adjusting the insertion depth of the second transmitter subassembly 4 into the bore 11*a* of the J-sleeve 11. After the Z-alignment, the second transmitter subassembly 4 is welded to the J-sleeve 11. The XY-alignment is secondly carried out by sliding the J-sleeve 11 on the side 9*c* of the housing 9. After the XY-alignment, the J-sleeve 11 is welded to the surface 9*c* by YAG laser welding.

Figure 3:
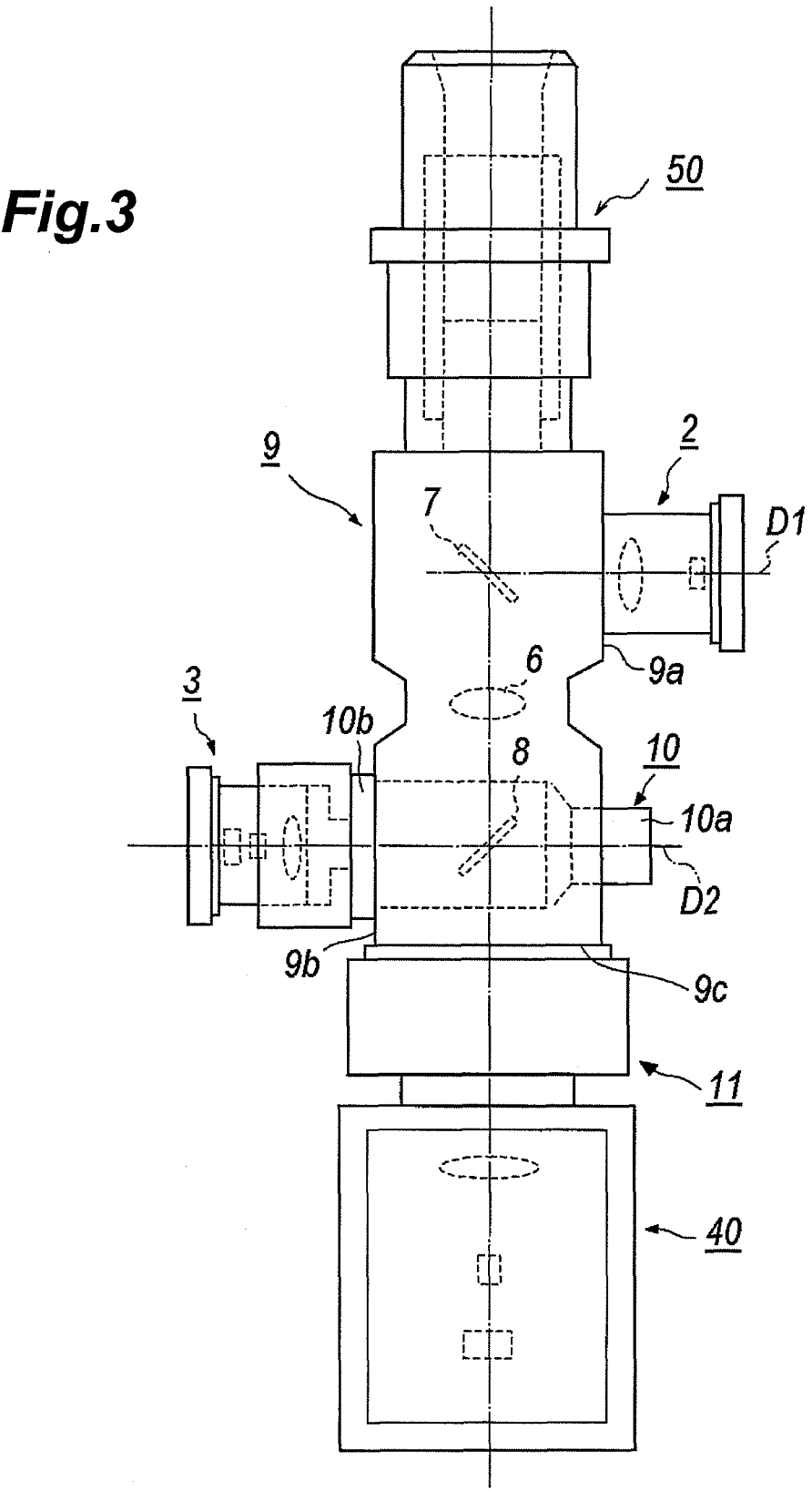
FIG. 3 is a plan view of another optical module according to an embodiment of the present invention.

FIG. 3 is a plan view showing another bi-directional optical module according to the second embodiment of the invention, where the second embodiment provides, instead of the coupling unit 5, an optical receptacle 50 to receive an optical connector. In addition, the optical module 1 of the first embodiment provides two transmitter subassemblies, 3 and 4, each having the co-axial package. The bi-directional optical module shown in FIG. 3 provides the second transmitter subassembly 40 with a package of a rectangular shape, which is often called as a butterfly package. This type of the transmitter subassembly 40 is fixed to the housing 9 via the J-sleeve 11.

Figure 4:
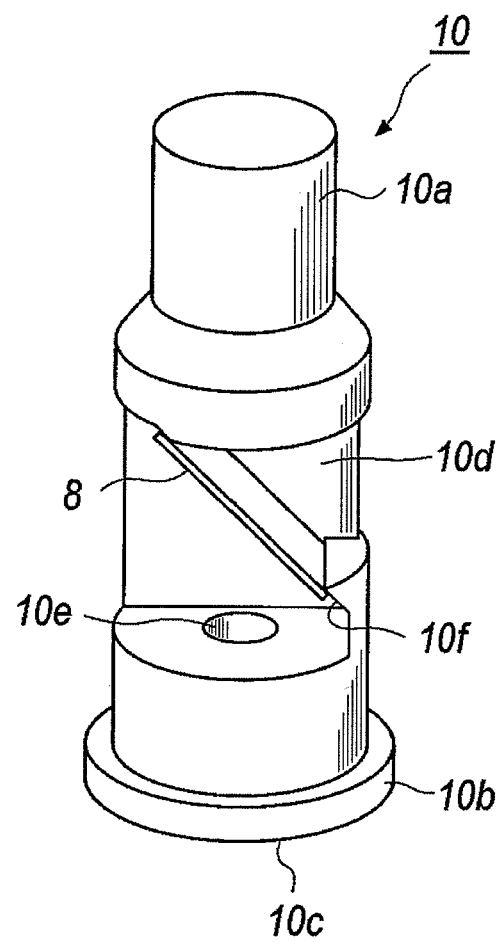
FIG. 4 is a perspective view of an auxiliary set in the optical module shown in FIGS. 1 and 3.

A feature of the bi-directional optical module according to the invention is that the auxiliary 10 is provided for aligning the first transmitter subassembly 3 whose optical axis D2 is perpendicular to the optical axis C of the optical fiber. Next, details of the auxiliary 10 will be described. FIG. 4 is a perspective view of the auxiliary 10. The auxiliary 10 has a feature that the surface of the knob 10*a* makes a concentric circle with the surface of the flange 10*b* to make the holding by a chuck stably and precisely. That is, the flange 10*b* is formed in concentric circle or in partially cut circle tracing the concentric circle to align the center thereof with the center of the knob 10*a*. Because the knob 10*a* has the concentric circle with the flange 10*b*, the center of the knob 10*a*, when it is held by the chuck of the welding apparatus, the center of the flange 10*b* is automatically aligned with the center of the chuck. Even when the auxiliary 10 is rotated after the first welding by a preset angle, the centering of the auxiliary 10 with respect to the chuck is maintained. Also, even when the housing has a shape asymmetry to the optical axis D2, which often makes the set of the housing on the welding apparatus unbalance, the physical relation between the knob 10*a* and the flange 10*b* is permanently maintained.

A welding apparatus generally provides a plurality of source heads each emitting a laser beam. Aligning the axis of respective laser beams with respect to the center of the knob 10*a*, the welding of the flange 10*b* with the J-sleeve 11 may be simplified and precisely carried out. Setting respective source heads with a constant pitch, the stress caused in points welded by the laser beams is cancelled, which suppresses the deviation of the optical axis. Moreover, the cylindrical shape of the auxiliary 10 facilitates the process to form it by, for instance, numerically controlled (NC) lathe with an excellent accuracy.

The auxiliary 10, as shown in FIG. 4, provides an opening 10*d* in a center thereof and a bore 10*e* in the side of the flange 10*b* to secure the optical path between the transmitter subassemblies, 3 and 4, and the optical fiber 5*a*. The second WDM filter 8 is set on a slope 10*f* formed continuous to the opening 10*d*. The slope 10*f* has an angle of substantially 45° with respect to the optical axis C of the optical fiber 5*a*, that D2 of the first transmitter subassembly 3, and that of the second transmitter subassembly 4.

Figure 5A:
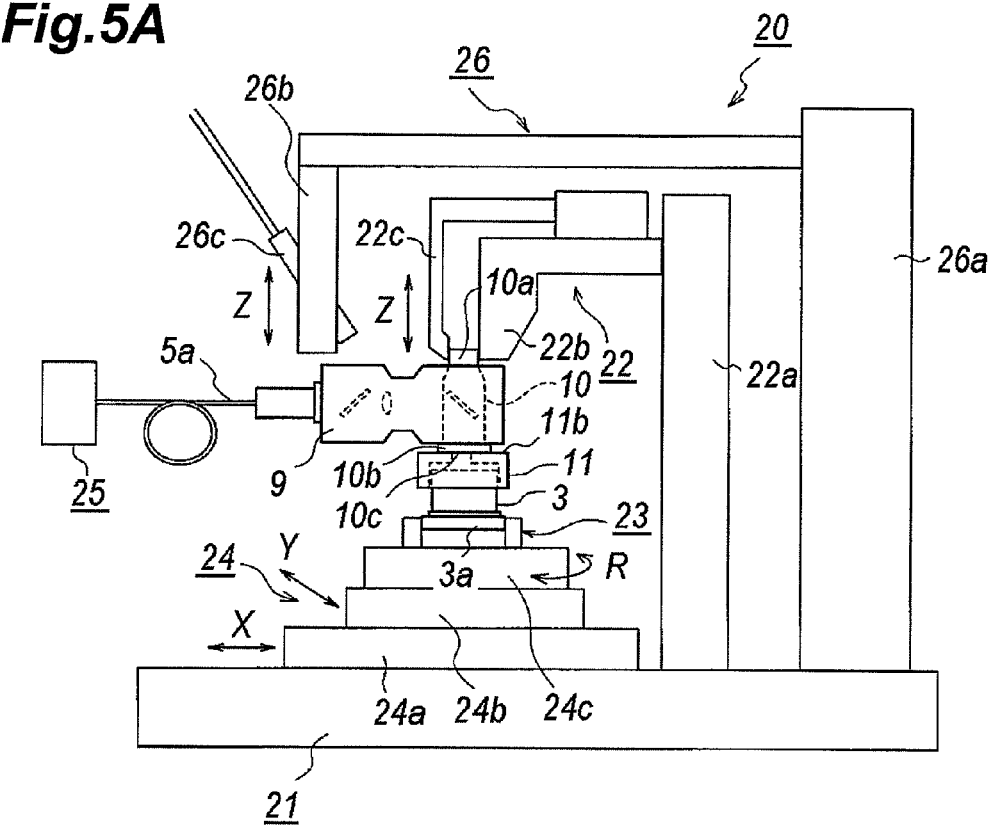
FIG. 5A schematically illustrates a welding apparatus setting the optical module shown in FIGS. 1 and 3, and FIG. 5B schematically illustrates the physical relation between the knob and the flange of the auxiliary, the top of the optical subassembly, and the chuck of the welding apparatus.

FIG. 5A schematically illustrates a welding apparatus 20 to assemble the bi-directional optical module 1 with the first transmitter subassembly 3. The apparatus 20 provides a first chuck 22 that is movable vertically and a second chuck 23 that is movable horizontally and rotatable around a vertical axis.

The first chuck 22 includes arms, 22*b* and 22*c*, each supported by a post 22*a*. The second chuck 23 is set on a stage 24 movable and rotatable horizontally. The stage 24 includes an X-stage 24*a* movable along the X-direction, a Y-stage 24*b* movable along the Y-direction, and an R-stage 24*c* rotatable horizontally. Respective stages, 24*a* to 24*c*, are preferably to be controlled digitally. The first chuck 22, the second chuck 24, and mechanisms 26 are set on a base 21.

The apparatus 20 further provides mechanisms 26 to weld an object, typically a YAG laser. The mechanisms 26 includes a pillar 26*b* supported by a post 26*a* and a head 26*c* held by the pillar 26*b*. The head 26*c*, as described, is aligned with respect to the first chuck 22. That is the axis of the head 26*c* is directed to the first chuck 22, and vertically moves synchronously with the vertical movement of the first chuck 22.

In a process to fix the first transmitter subassembly 3 to the housing 9, the housing 9 is first set on the apparatus 20 as the auxiliary 10 is inserted within and fixed to the housing 9 and the optical fiber 5*a* is assembled therewith. The first chuck 22 holds the knob 10*a* of the auxiliary 10 as the housing 9 is hung down from the first chuck 22. The external fiber 5*a* is coupled with an optical power meter 25.

The first transmitter subassembly 3, as movable along the optical axis thereof by being assembled with the J-sleeve 11, is held in the stem 3*a* thereof by the second chuck 23. Because the first chuck 22 causes a magnetic force for the J-sleeve 11, the top 11*b* of the J-sleeve 11 faces and comes in contact with the surface 10*c* of the flange 10*b*, but movable on the surface 10*c*.

Then, the LD installed within the first transmitter subassembly 3 is practically activated to emit light, and this light is monitored by the power meter 25. Moving the housing 9 vertically by the first chuck 22, then moving the first transmitter subassembly 3 horizontally by the second chuck 23, the first transmitter subassembly 3 is aligned in a position where the power meter 25 detects a maximum optical power.

The optical alignment of the first transmitter subassembly 3 may be changed in the order thereof. Specifically, the horizontal position of the first optical transmitter subassembly 3 is aligned to maximize the received optical power by the power meter 25; then, the vertical position of the housing 9 is adjusted to set the received optical power by the power meter 25 in a preset level. After the optical alignment above, the YAG laser welding permanently fixes the J-sleeve 11 with the first transmitter subassembly 3.

Next, the first transmitter subassembly 3, which is set on the second chuck 23, is slid horizontally again by the stages 24 to maximize the optical power received by the power meter 25. Specifically, the top 11*b* of the J-sleeve 11 is slid on the surface 10*c* of the flange 10*b*. After the alignment, the flange 10*b* of the auxiliary 10 is welded to the J-sleeve 11 in several points along the periphery of the flange 10*b*. The process described above first aligns the first transmitter subassembly 3 vertically with the auxiliary 10; then horizontally aligns the first transmitter subassembly 3. However, the process is not restricted to this order. Horizontal alignment between the first transmitter subassembly 3 and the auxiliary 10 may be first carried out to maximize the received optical power at the power meter 25; then the vertical alignment may be performed between the J-sleeve 11 and the first transmitter subassembly 3 to set the optical power received by the power meter 25 in the predetermined level.

Figure 5B:
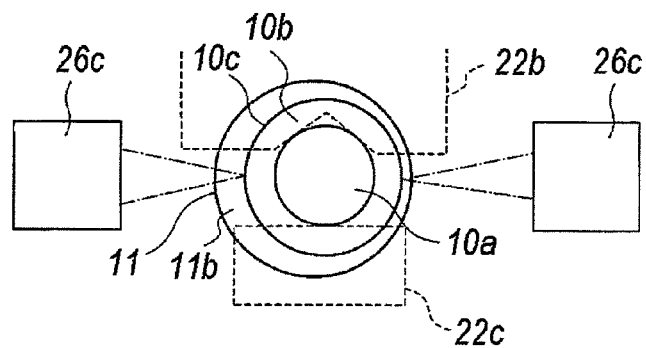
Figure 6:
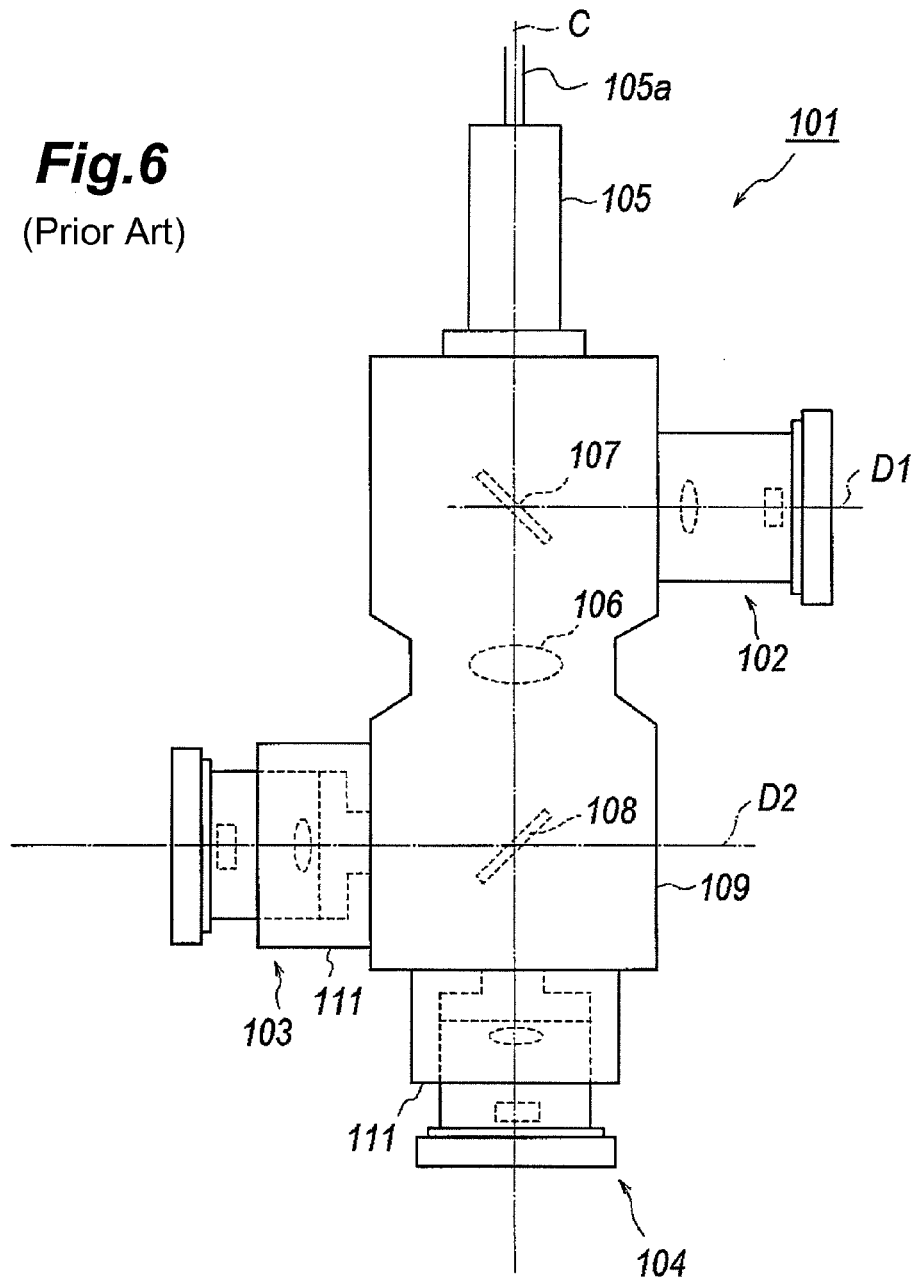
FIG. 6 is a plan view of a conventional optical module without any auxiliary.

FIG. 5B is a plan view showing positional relation of heads 26c with respect to the flange 10b of the auxiliary 10 and the J-sleeve 11. FIG. 5B shows a case where two heads 26c set in positions opposite to each other as putting the first transmitter subassembly 3 therebetween; that is, two heads 26c are set by an angle of 180°. Specifically, the first chuck 22 includes two arms, 22b and 22c, to pick the knob 10a therebetween.

Because the flange 10b in the periphery thereof has the concentric circle with the knob 10a, the YAG-laser beams output from the heads 26c focused on the periphery 10c of the flange 10b in opposite positions with respect to the center thereof. Even the auxiliary 10 is vertically moved to align optically along the optical axis, the YAG-laser beams are maintained in the focused positions thereof on the periphery 10c of the flange 10b. Thus, the welding of the flange 10b of the auxiliary 10 to the top 11b of the J-sleeve 11 may be carried out as keeping their relative position precisely.

Moreover, even when the J-sleeve 11 is slid on the surface 10c of the flange 10b, the focused position of the beams from the heads 26c is maintained on the periphery 10c of the flange 10b because the positional relation between the flange 10b and the heads 26c is invariant in the horizontal directions.

In addition, the top 11b of the J-sleeve 11 has a larger area compared with the top area 10c of the flange 10b, in other words, as shown in FIG. 5B, the top area 10c of the flange 10b is inside of the top 11b of the J-sleeve 11. This means that, even the horizontal alignment between the J-sleeve 11 and the flange 10b causes a discrepancy in the center of the top 11b and that of the flange 10b; the flange 10b in the periphery thereof may be maintained inside of the top 11b of the J-sleeve 11.

The optical module 1 of the embodiment includes the auxiliary 10 that provides the knob 10a and the flange 10b, where they have a pillar shape with the common center, namely the knob 10a and the flange 10b in peripheries thereof form concentric circles. The knob 10a is supported by the chuck 22 of the welding apparatus 20; while, the flange 10b is welded to the top 11b of the J-sleeve 11 attached to the first transmitter subassembly 3. Then, even when the first transmitter subassembly 3 has the optical axis thereof perpendicular to the primary optical axis C connecting the optical fiber 5a and the other optical transmitter subassembly 4 and the housing 9 has the shape asymmetry to the optical axis of the first transmitter subassembly 3, the apparatus 20 may precisely align the first transmitter subassembly 3 with the optical fiber 5a.

The auxiliary 10 of the embodiment is for the first transmitter subassembly 3; however, a similar auxiliary according to the embodiment may be prepared for the receiver subassembly 2 that has the optical axis D1 perpendicular to the primary optical axis C. Also, the receiver subassembly 2, which is assembled in closest to the optical fiber 5a in the present embodiment, the receiver subassembly 2 and the first transmitter subassembly 3, or the second transmitter subassembly 4, may be replaceable with each other. In such an arrangement, the WDM filters, 7 and 8, set within the housing 9 is necessary to vary the optical characteristics, specifically, the cut-off wavelengths, the wavelength band to transmit light, and/or the wavelength band to cut light, depending on the arrangement of the subassemblies, 2 to 4.

Accordingly, the present invention should not be considered limited to the particular examples described above, but should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. An optical module, comprising:
   a housing;
   a coupling unit configured to secure an optical fiber that has a primary optical axis, the coupling unit being fixed to the housing;
   an optical subassembly having an optical axis perpendicular to the primary optical axis; and
   an auxiliary including a knob and a flange each having a circular periphery concentric to each other, the flange being fixed to the optical subassembly, the knob protruding from the housing, the auxiliary installing an optical component to align the optical axis of the optical subassembly with the primary optical axis,
   wherein the housing has an asymmetry shape with respect to the optical axis of the optical subassembly.

2. The optical module of claim 1,
   wherein the optical subassembly includes a joint sleeve and a package, the joint sleeve aligning the package along the optical axis thereof, the joint sleeve being fixed to the flange of the auxiliary.

3. The optical module of claim 2,
   wherein the joint sleeve has a top and a bore, the top being fixed to the flange of the auxiliary and the bore receiving the package.

4. The optical module of claim 2,
   wherein the joint sleeve has a cylindrical shape with a circular periphery within a periphery of the flange.

5. The optical module of claim 2,
   wherein the package installs a semiconductor laser diode therein and has a lens to collimate light emitted from the laser diode.

6. The optical module of claim 2,
   wherein the package installs a semiconductor photodiode to receive light provided from the optical fiber.

7. The optical module of claim 1,
   wherein the optical component in the auxiliary is a mirror inclined by substantially 45° with respect to the optical axis of the optical subassembly and to the primary optical axis of the optical fiber.

8. The optical module of claim 1,
   wherein the housing installs a lens to concentrate light on the optical fiber.

9. An optical module, comprising:
   a housing;
   a coupling unit configured to secure an optical fiber that has a primary optical axis, the coupling unit being fixed to the housing;
   an optical subassembly having an optical axis perpendicular to the primary optical axis, the optical subassembly including a joint sleeve and a package, the joint sleeve aligning the package along the optical axis thereof; and
   an auxiliary including a knob and a flange each having a circular periphery concentric to each other, the flange being fixed to the optical subassembly, the auxiliary installing an optical component to align the optical axis of the optical subassembly with the primary optical axis,
   wherein the housing has an asymmetry shape with respect to the optical axis of the optical subassembly,
   wherein the joint sleeve of the optical subassembly is fixed to the flange of the auxiliary.

* * * * *